(12) United States Patent
Nakajima

(10) Patent No.: US 9,868,852 B2
(45) Date of Patent: Jan. 16, 2018

(54) RUBBER COMPOSITION FOR TIRE AND PNEUMATIC TIRE

(71) Applicant: SUMITOMO RUBBER INDUSTRIES, LTD., Kobe-shi, Hyogo (JP)

(72) Inventor: Hiroki Nakajima, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/344,044

(22) Filed: Nov. 4, 2016

(65) Prior Publication Data

US 2017/0158845 A1    Jun. 8, 2017

(30) Foreign Application Priority Data

Dec. 4, 2015   (JP) .................................. 2015-237754

(51) Int. Cl.
*C08L 9/06*      (2006.01)
*B60C 1/00*     (2006.01)

(52) U.S. Cl.
CPC .................. *C08L 9/06* (2013.01); *B60C 1/00* (2013.01); *B60C 1/0016* (2013.01); *C08G 2261/3325* (2013.01); *C08L 2205/025* (2013.01); *C08L 2205/03* (2013.01)

(58) Field of Classification Search
CPC ... C08L 9/06; C08L 2205/025; C08L 2205/03
See application file for complete search history.

(56) References Cited

U.S. PATENT DOCUMENTS

2009/0326109 A1* 12/2009 Kameda ................ B60C 1/0016
                                                                            524/110

FOREIGN PATENT DOCUMENTS

JP          10-204216 A      8/1998

* cited by examiner

*Primary Examiner* — Robert Harlan
(74) *Attorney, Agent, or Firm* — Birch, Stewart, Kolasch & Birch, LLP

(57) ABSTRACT

An object of the present invention is to provide a rubber composition for tire which can improve initial grip performance and stable grip performance during running at a high level while maintaining sufficient abrasion resistance, and a pneumatic tire having a tread composed of this rubber composition for tire. The rubber composition for tire comprises 70 to 200 parts by mass of a filler and 60 to 250 parts by mass of a softener compounding 15 to 60 parts by mass of a predetermined tackifying resin with a softening point of not less than 110° C. based on 100 parts by mass of a diene rubber component comprising not less than 20% by mass of a SBRa having a glass transition temperature of −35 to 15° C., a styrene content of 35 to 48% by mass and a vinyl unit quantity in the butadiene component of 35 to 55%.

8 Claims, No Drawings

RUBBER COMPOSITION FOR TIRE AND PNEUMATIC TIRE

TECHNICAL FIELD

The present invention relates to a rubber composition for tire and a pneumatic tire having a tread composed of the rubber composition for tire.

BACKGROUND OF THE INVENTION

For a rubber composition for tread of pneumatic tires, in particular a rubber composition for tread of high performance tires such as competition tires, there is a strong demand of high grip performance from the beginning of running (initial grip performance) and stable grip performance during running (grip performance during running), and various measures have been taken to secure the both performance.

In order to improve initial grip performance, a method of using a polymer with a low styrene content, a low softening point resin or a softener with a low temperature for a rubber composition for tread has been considered. On the other hand, in order to stabilize grip performance during running, a method of using a polymer with a high styrene content or a high softening point resin for a rubber composition for tread has been considered.

However, in tires having a tread compounding a polymer with a low styrene content or a low softening point resin, while initial grip performance is improved, there is a problem that grip performance during running is lowered as a temperature of the tread increases. On the other hand, in tires having a tread compounding a polymer with a high styrene content or a high softening point resin, there is a problem that initial grip performance and abrasion resistance are significantly deteriorated while grip performance during running is stable.

While JP 10-204216 A discloses a rubber composition for tread of high performance tires that comprises a dipentene-aromatic vinyl copolymer having a specific softening point based on 100 parts by weight of rubber mainly composed of an SBR having a high glass transition temperature, improvement of both initial grip performance and grip performance during running is not considered.

SUMMARY OF THE INVENTION

The present invention aims to solve the above problems and provide a rubber composition for tire that can improve initial grip performance and stable grip performance during running at a high level while maintaining sufficient abrasion resistance, and a pneumatic tire having a tread composed of this rubber composition for tire.

The present invention is a rubber composition for tire comprising:
70 to 200 parts by mass of a filler and
60 to 250 parts by mass of a softener compounding 15 to 60 parts by mass of a tackifying resin with a softening point of not less than 110° C. based on 100 parts by mass of a diene rubber comprising not less than 20% by mass of a styrene-butadiene copolymer rubber a (SBRa) having a glass transition temperature of −35 to 15° C., a styrene content of 35 to 48% by mass and a vinyl unit quantity in the butadiene component of 35 to 55%,
wherein the tackifying resin is a copolymer resin of 1-methyl-4-(1-methylethenyl)-cyclohexene and/or (1S,5S)-2,6,6-trimethylbicyclo[3.1.1]-2-heptene and/or (1S,5S)-6,6-dimethyl-2-methylenebicyclo[3.1.1]heptane and aromatic vinyl, or a hydrogenated product thereof.

It is preferable that the aromatic vinyl of the tackifying resin is styrene.

It is preferable that the diene rubber component is a diene rubber component consisted of an SBRa and a styrene-butadiene copolymer rubber b other than SBRa (SBRb) only.

It is preferable that the filler comprises not less than 70 parts by mass of carbon black having a nitrogen adsorption specific surface area of 100 to 300 $m^2/g$ and oil absorption number of 100 to 150 $cm^3/100$ g.

The present invention also relates to a pneumatic tire having a tread composed of the rubber composition for tire.

According to the present invention, it is possible to provide a rubber composition for tire that can improve initial grip performance and stable grip performance during running at a high level while maintaining sufficient abrasion resistance, and a pneumatic tire having a tread composed of this rubber composition for tire.

DETAILED DESCRIPTION

The rubber composition for tire comprises a predetermined amount of filler and a softener comprising a predetermined tackifying resin based on 100 parts by mass of a diene rubber component comprising not less than 20% by mass of a predetermined styrene-butadiene copolymer rubber a (SBRa).

Diene Rubber Component

The diene rubber component comprises a styrene-butadiene copolymer rubber a (SBRa) having a glass transition temperature of −35 to 15° C., a styrene content of 35 to 48% by mass and a vinyl unit quantity in the butadiene component of 35 to 55%. Examples of the SBRa include an emulsion-polymerized styrene-butadiene rubber (E-SBR) and a solution-polymerized styrene-butadiene rubber (S-SBR) and either of which can be used.

The glass transition temperature (Tg) of the SBRa is not less than −35° C., preferably not less than −20° C. If the Tg is less than −35° C., stable grip performance during running may not be obtained. On the other hand, the Tg of the SBRa is not more than 15° C., preferably not more than 0° C. If the Tg exceeds 15° C., sufficient initial grip performance may not be obtained. The Tg of the styrene-butadiene copolymer rubber as used herein is based on JIS K 6229 and is determined by removing extended oil by use of acetone and measuring a pure SBR content by differential scanning calorimetry (DSC) in accordance with JIS K 7121.

The styrene content of the SBRa is not less than 35% by mass, preferably not less than 38% by mass. If the content is less than 35% by mass, sufficient grip performance tends not to be obtained. On the other hand, the styrene content of the SBRa is not more than 48% by mass, preferably not more than 45% by mass. If the content exceeds 48% by mass, there is a tendency that abrasion resistance deteriorates, temperature dependence increases and a performance change with respect to temperature change increases.

The vinyl unit quantity in the butadiene component of the SBRa is not less than 35%, preferably not less than 38%. If the vinyl unit quantity in the SBRa is less than 35% by mass, sufficient grip performance may not be obtained. On the other hand, the vinyl unit quantity in the butadiene component of the SBRa is not more than 55%, preferably not more than 45%. If the content exceeds 55%, sufficient initial grip performance may not be obtained.

The content of the SBRa in the diene rubber component is not less than 20% by mass, preferably not less than 30% by mass, more preferably not less than 40% by mass. If the content is less than 20% by mass, sufficient initial grip performance and stable grip performance during running may not be obtained. The upper limit of the content of the SBR is not limited but is preferably 100% by mass from the viewpoint of satisfactory grip performance during running and is preferably not more than 80% by mass from the viewpoint of sufficient abrasion resistance.

The diene rubber can comprise a diene rubber component other than the SBRa. Examples of the diene rubber component other than the SBRa include a natural rubber (NR), an isoprene rubber (IR), a butadiene rubber (BR), a styrene-butadiene copolymer rubber b other than SBRa (SBRb), a styrene-isoprene-butadiene rubber (SIBR), an ethylene propylene diene rubber (EPDM), a chloroprene rubber (CR), an acrylonitrile-butadiene rubber (NBR), a butyl rubber (IIR) and the like, and it is preferable that the diene rubber comprises an SBRb since satisfactory grip performance and abrasion resistance can be obtained and a diene rubber composed of the SBRa and SBRb only is more preferable.

Examples of the SBRb include an emulsion-polymerized styrene-butadiene rubber (E-SBR), a solution-polymerized styrene-butadiene rubber (S-SBR) and either of them can be used. The glass transition temperature (Tg), styrene content, vinyl unit quantity and the like of the SBRb are not limited particularly.

In the case where the diene rubber comprises the SBRb, the content of the SBRb in the diene rubber component is preferably 20 to 80% by mass from the viewpoint of a favorable balance of abrasion resistance and grip performance.

Filler

The filler may be optionally selected from ones commonly used in a conventional rubber composition for tire such as carbon black, silica, calcium carbonate, alumina, clay, talc and the like and used. Among these, carbon black is preferable from the viewpoint of reinforcing property.

The content of the filler is preferably not less than 70 parts by mass, more preferably not less than 80 parts by mass since sufficient abrasion resistance can be obtained. On the other hand, the content of the filler is preferably not more than 200 parts by mass, more preferably not more than 180 parts by mass since sufficient initial grip performance can be obtained.

The nitrogen adsorption specific surface area of carbon black is preferably not less than 100 $m^2/g$, more preferably not less than 105 $m^2/g$ since sufficient grip performance can be obtained. On the other hand, the nitrogen adsorption specific surface area of carbon black is preferably not more than 300 $m^2/g$, more preferably not more than 250 $m^2/g$ since a satisfactory dispersed state can be maintained and sufficient abrasion resistance can be obtained. It is noted that the nitrogen adsorption specific surface area of carbon black is determined in accordance with JIS K 6217-2.

The oil absorption number (OAN) of carbon black is preferably not less than 100 $cm^3/100$ g, more preferably not less than 110 $cm^3/100$ g since sufficient abrasion resistance can be obtained. On the other hand, the OAN is preferably not more than 150 $cm^3/100$ g, more preferably not more than 145 $cm^3/100$ g since sufficient grip performance can be obtained. It is noted that the OAN of carbon black is measured in accordance with JIS K 6217-4.

In the case where the diene rubber comprises the carbon black, the content thereof based on 100 parts by mass of the rubber component is not less than 70 parts by mass, preferably not less than 80 parts by mass, further preferably not less than 100 parts by mass. If the content is less than 70 parts by mass, sufficient abrasion resistance and grip performance may not be obtained. On the other hand, the content is not more than 200 parts by mass, preferably not more than 180 parts by mass. If the content exceeds 200 parts by mass, grip performance may be deteriorated.

Softener

The softener is characterized by comprising a tackifying resin that has a softening point of not less than 110° C. and is a copolymer resin of 1-methyl-4-(1-methylethenyl)-cyclohexene and/or (1S,5S)-2,6,6-trimethylbicyclo[3.1.1]-2-heptene and/or (1S,5S)-6,6-dimethyl-2-methylenebicyclo[3.1.1]heptane and aromatic vinyl, or a hydrogenated product thereof.

The softening point of the tackifying resin is not less than 110° C., preferably not less than 115° C. If the softening point is less than 110° C., sufficient grip performance may not be obtained. The upper limit of the softening point of the resin is not limited particularly. It is noted that the softening point of a resin as used herein is one specified in JIS K 6220-1 and is a temperature at the time when the ball has dropped in the measurement with a ring and ball softening point measuring device.

Examples of the aromatic vinyl that constitutes a copolymer resin as a tackifying resin include styrene, methylstyrene, chlorostyrene, bromostyrene, fluorostyrene, nitrostyrene, vinylphenol, divinylbenzene, isopropenylbenzene and the like and styrene is preferable since stable grip performance during running can be obtained.

Examples of commercially available products of the tackifying resin include TO125 (softening point: 125° C., copolymer of 1-methyl-4-(1-methylethenyl)-cyclohexene and styrene), M125 (softening point: 125° C., hydrogenated product of copolymer of 1-methyl-4-(1-methylethenyl)-cyclohexene and (1S,5S)-2,6,6-trimethylbicyclo[3.1.1]-2-heptene(1S,5S)-6,6-dimethyl-2-methylenebicyclo[3.1.1]heptane and styrene) manufactured by YASUHARA CHEMICAL CO., LTD. and the like.

The content of the tackifying resin based on 100 parts by mass of the rubber component is not less than 15 parts by mass, preferably not less than 20 parts by mass. If the content is less than 15 parts by mass, sufficient grip performance may not be obtained. On the other hand, the content of the tackifying resin is not more than 60 parts by mass, preferably not more than 50 parts by mass. If the content exceeds 60 parts by mass, sufficient initial grip performance and abrasion resistance may not be obtained.

The softener can comprise a softener component other than the tackifying resin. The softener component other than the tackifying resin is not limited particularly and for example, if the softener component is oil, examples thereof include mineral oil such as aromatic oil, process oil, paraffin oil and the like. Further, it is more preferable that a low molecular weight liquid polymer is used as a softener since it is excellent in a balance of durability and grip performance. With respect to the molecular weight of the low molecular weight liquid polymer, it is preferable that a weight-average molecular weight in terms of polystyrene, which is measured by gel permeation chromatography (GPC), is $1.0 \times 10^3$ to $2.0 \times 10^5$. If the molecular weight is less than $1.0 \times 10^3$, breaking resistance deteriorates and sufficient durability may not be ensured. On the other hand, if the molecular weight exceeds $2.0 \times 10^5$, viscosity of a polymerization solution becomes too high and processability may deteriorate. Examples of the low molecular weight liquid polymer include liquid SBR, liquid BR, liquid IR, liquid SIR and the like and the use of liquid SBR is preferable since a favorable balance of durability and grip performance can be achieved. These softeners may be used alone, or may be used in combination with two or more thereof. Among them, since a favorable balance of durability and grip performance can be achieved, the use of a low molecular weight liquid polymer is preferable and the use of liquid SBR is more preferable.

The total content of the softener comprising the tackifying resin based on 100 parts by mass of the rubber component is not less than 60 parts by mass, preferably not less than 90 parts by mass. If the content is less than 60 parts by mass, sufficient grip performance may not be obtained. On the other hand, the content of the softener is not more than 250 parts by mass, preferably not more than 230 parts by mass. If the content exceeds 250 parts by mass, processability tends to deteriorate.

The rubber composition for tire of the present invention can suitably comprise, in addition to the above components, compounding agents that have used in the rubber industry such as, for example, a zinc oxide, wax, various anti-aging agents, a stearic acid, a vulcanizing agent such as sulfur, a vulcanization accelerator and the like as necessary.

Examples of the vulcanization accelerator include a sulfenamide vulcanization accelerator, a thiazole vulcanization accelerator, a thiuram vulcanization accelerator, a guanidine vulcanization accelerator, a dithiocarbamate vulcanization accelerator, and among these, a sulfenamide vulcanization accelerator and a dithiocarbamate vulcanization accelerator can be suitably used.

Examples of the sulfenamide vulcanization accelerator include N-tert-butyl-2-benzothiazolylsulfenamide (NS), N-cyclohexyl-2-benzothiazolylsulfenamide (CZ), N-oxydiethylene-2-benzothiazolylsulfenamide (MSA) and the like and among these, it is preferable to use NS or CZ.

Examples of the dithiocarbamate vulcanization accelerator include zinc dibenzyldithiocarbamate (ZTC), zinc dimethyldithiocarbamate (PZ), zinc N-pentamethylenedithiocarbamate (ZP), sodium dibutyldithiocarbamate (TP) and the like and among these, it is preferable to use ZTC.

In the case where the rubber composition comprises a vulcanization accelerator, the content thereof based on 100 parts by mass of the rubber component is preferably not less than 1 part by mass, more preferably not less than 3 parts by mass since a sufficient vulcanization speed can be secured and satisfactory grip performance and abrasion resistance can be obtained. On the other hand, the content of the vulcanization accelerator is preferably not more than 15 parts by mass, more preferably not more than 10 parts by mass since deterioration of grip performance and abrasion resistance due to blooming is prevented.

The vulcanizing agent is preferably sulfur. In the case where the rubber composition comprises sulfur, the content thereof based on 100 parts by mass of the rubber component is preferably not less than 0.5 part by mass since a sufficient vulcanization reaction can be secured and satisfactory grip performance and abrasion resistance can be obtained. On the other hand, the content is preferably not more than 3 parts by mass since deterioration of grip performance and abrasion resistance due to blooming is prevented.

The zinc oxide is not limited particularly as long as it is ones that has been used in the rubber industry such as in tires, but it is preferable to use fine particle zinc oxide.

The average primary particle size of the zinc oxide is preferably not more than 200 nm, more preferably not more than 100 nm since abrasion resistance is not negatively affected. On the other hand, while a lower limit of the average primary particle size of the zinc oxide is not limited particularly, the average primary particle size of the zinc oxide is preferably not less than 20 nm, more preferably not less than 30 nm. It is noted that the average primary particle size of the zinc oxide as used herein is an average particle size (average primary particle size) which is converted from a specific surface area measured in accordance with a BET method based on nitrogen adsorption.

In the case where the rubber composition comprises a zinc oxide, the content thereof based on 100 parts by mass of the diene rubber component is preferably not less than 0.5 part by mass, more preferably not less than 1.0 part by mass. On the other hand, the content of the zinc oxide is preferably not more than 10 parts by mass, more preferably not more than 5 parts by mass. If the content of the zinc oxide is within the above range, the effect of the present invention can be suitably obtained.

A known method can be used as a production method of the rubber composition for tire of the present invention and for example, the rubber composition can be produced by a method of kneading each of components with a Banbury mixer, a kneader, an open roll and the like and subsequently vulcanizing the same. Additionally, since the rubber composition for tire of the present invention is a rubber composition for tire that can improve initial grip performance and stable grip performance during running at a high level while maintaining sufficient abrasion resistance, it can be suitably used for a tread of a pneumatic tire.

The pneumatic tire can be produced by a general method using the rubber composition of the present invention. That is, the rubber composition is extruded into the shape of a tread in an unvulcanized state, laminated with other components of the tire on a tire building machine and formed in a normal method to obtain an unvulcanized tire. This unvulcanized tire is heated and pressurized in a vulcanizer to produce a high performance tire of the present invention. It is noted that the pneumatic tire in the present invention can be suitably used for competition tires such as racing tires and for high performance dry tires which are particularly used on a dry road surface.

EXAMPLE

Hereinafter, the present invention will be described based on Examples, but the present invention is not limited thereto only.

A variety of chemicals used in Examples and Comparative Examples will be explained.

SBR 1: TUFDENE 4850 (S-SBR, Tg: −15° C., styrene content: 40% by mass, vinyl unit quantity in butadiene component: 41%, oil content based on 100 parts by mass of solid content of rubber: 50 parts by mass) manufactured by Asahi Kasei Chemicals Corporation SBR 2: TUFDENE 3830 (S-SBR, Tg: −34° C., styrene content: 35% by mass, vinyl unit quantity in butadiene component: 33%, oil content based on 100 parts by mass of solid content of rubber: 37.5 parts by mass) manufactured by Asahi Kasei Chemicals Corporation Carbon black: N220 (nitrogen adsorption specific surface area: 114 $m^2$/g, oil absorption amount: 114 $cm^3$/100 g) manufactured by CABOT Japan K. K.

Oil: Diana Process AH-24 manufactured by Idemitsu Kosan Co., Ltd.

Liquid polymer: L-SBR-820 (liquid SBR, Mw: 10,000) manufactured by KURARAY CO., LTD.

Tackifying resin 1: Koresin (softening point: 160° C., copolymer of p-t-butylphenol and acetylene) manufactured by BASF SE Tackifying resin 2: YS resin TO125 (softening point: 125° C., copolymer of 1-methyl-4-(1-methylethenyl)-cyclohexene and styrene) manufactured by YASUHARA CHEMICAL CO., LTD.
Tackifying resin 3: CLEARON M125 (softening point: 125° C., hydrogenated product of copolymer of 1-methyl-4-(1-methylethenyl)-cyclohexene and (1S,5S)-2,6,6-trimethylbicyclo[3.1.1]-2-heptene and/or (1S,5S)-6,6-dimethyl-2-methylenebicyclo[3.1.1]heptane and styrene) manufactured by YASUHARA CHEMICAL CO., LTD.
Wax: SUNNOC N manufactured by Ouchi Shinko Chemical Industrial Co., Ltd.
Anti-aging agent 1: Nocrack 6C manufactured by Ouchi Shinko Chemical Industrial Co., Ltd.
Anti-aging agent 2: Nocrack RD manufactured by Ouchi Shinko Chemical Industrial Co., Ltd.
Stearic acid: Stearic acid "Tsubaki" manufactured by NOF CORPORATION Zinc oxide: ZINCOX SUPER F1 (average primary particle size: 100 nm) manufactured by HakusuiTech Co., Ltd.
Sulfur: sulfur powder manufactured by TSURUMI CHEMICAL INDUSTRY CO., LTD.
Vulcanization accelerator 1: Nocceler NS (N-tert-butyl-2-benzothiazylsulfeneamide) manufactured by OUCHI SHINKO CHEMICAL INDUSTRIAL CO., LTD.
Vulcanization accelerator 2: Nocceler ZTC (zinc dibenzyldithiocarbamate) manufactured by OUCHI SHINKO CHEMICAL INDUSTRIAL CO., LTD.

Examples and Comparative Examples

According to formulations shown in Table 1, all of the chemicals (other than sulfur and vulcanization accelerator) were kneaded with a 1.7 L Banbury mixer manufactured by Kobe Steel, Ltd. to obtain a kneaded product. To the obtained kneaded product were added sulfur and the vulcanization accelerator and the mixture was kneaded using an open roll to obtain an unvulcanized rubber composition. The obtained unvulcanized rubber composition was formed into the shape of a tread, laminated with other components of the tire in a tire building machine and vulcanized for 30 minutes under a condition of 150° C. to obtain tires for test (tire size: 215/45R17). With respect to the obtained tires for test, the following evaluations were conducted. The results are shown in Table 1.

Initial Grip Performance

Each of the test tires was loaded on a domestically produced FR vehicle of 2000 cc displacement, followed by the in-vehicle running on a test course on a dry asphalt road for 10 laps. During running, stability of control in handling at the second lap was evaluated by a test driver and the results are shown with indexes, regarding the result of Comparative Example 1 as 100 (initial grip performance index). The greater number implies higher initial grip performance. Initial grip performance is determined to be particularly satisfactory when the index value is not less than 110.

Grip Performance During Running

Each of the test tires was loaded on a domestically produced FR vehicle of 2000 cc displacement, followed by the in-vehicle running on a test course on a dry asphalt road for 10 laps. During running, stability of control in handling at the best lap and at the final lap was evaluated by a test driver and the results are shown with indexes, regarding the result of Comparative Example 1 as 100. The greater number implies that deterioration of grip performance during running on the dry road surface is small and stable grip performance during running can be suitably obtained. Grip performance during running is determined to be particularly satisfactory when the index value is not less than 110.

Abrasion Resistance

Each of the test tires was loaded on a domestically produced FR vehicle of 2000 cc displacement, followed by the in-vehicle running on a test course on a dry asphalt road. After running, the amount of a remained groove of the tread rubber of tires was measured (15 mm in a new product) and the results are shown with indexes, regarding the amount of the remained groove of Comparative Example 1 as 100 (abrasion resistance index). The greater number implies higher abrasion resistance. Abrasion resistance is determined to be satisfactory when the index value is not less than 96.

TABLE 1

|  | Comparative Examples | | | | Examples | | | |
| --- | --- | --- | --- | --- | --- | --- | --- | --- |
|  | 1 | 2 | 3 | 4 | 1 | 2 | 3 | 4 |
| Compounding amount (part by mass) | | | | | | | | |
| SBR 1 | — | — | — | 90 | 90 | 90 | 90 | 90 |
| SBR 2 | 137.5 | 137.5 | 137.5 | 55 | 55 | 55 | 55 | 55 |
| Carbon black | 120 | 120 | 120 | 120 | 120 | 120 | 120 | 120 |
| Oil | 80 | — | — | — | — | — | — | — |
| Liquid polymer | — | 80 | 50 | 42.5 | 42.5 | 42.5 | 22.5 | 22.5 |
| Tackifying resin 1 | — | — | 30 | 30 | — | — | — | — |
| Tackifying resin 2 | — | — | — | — | 30 | — | 50 | — |
| Tackifying resin 3 | — | — | — | — | — | 30 | — | 50 |
| Wax | 2 | 2 | 2 | 2 | 2 | 2 | 2 | 2 |
| Anti-aging agent 1 | 1.5 | 1.5 | 1.5 | 1.5 | 1.5 | 1.5 | 1.5 | 1.5 |
| Anti-aging agent 2 | 2 | 2 | 2 | 2 | 2 | 2 | 2 | 2 |
| Stearic acid | 2 | 2 | 2 | 2 | 2 | 2 | 2 | 2 |
| Zinc oxide | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| Vulcanization accelerator 1 | 4 | 4 | 4 | 4 | 4 | 4 | 4 | 4 |
| Vulcanization accelerator 2 | 1 | 1 | 1 | 1 | 1 | 1 | 1 | 1 |

TABLE 1-continued

|  | Comparative Examples | | | | Examples | | | |
| --- | --- | --- | --- | --- | --- | --- | --- | --- |
|  | 1 | 2 | 3 | 4 | 1 | 2 | 3 | 4 |
| Evaluation |  |  |  |  |  |  |  |  |
| Initial grip performance | 100 | 102 | 80 | 78 | 125 | 125 | 115 | 116 |
| Grip performance during running | 100 | 115 | 130 | 132 | 120 | 122 | 140 | 142 |
| Abrasion resistance | 100 | 90 | 60 | 80 | 117 | 120 | 112 | 119 |

From the results shown in Table 1, it is found that a pneumatic tire having a tread composed of a rubber composition for tire comprising a predetermined amount of a filler and a copolymer resin of 1-methyl-4-(1-methylethenyl)-cyclohexene and/or (1S,5S)-2,6,6-trimethylbicyclo[3.1.1]-2-heptene and/or (1S,5S)-6,6-dimethyl-2-methylenebicyclo[3.1.1]heptane and aromatic vinyl, or a hydrogenated product thereof that has a softening point of not less than 110° C. based on a diene rubber component comprising a predetermined amount of SBRa is a tire in which initial grip performance and stable grip performance during running are improved at a high level while maintaining sufficient abrasion resistance.

What is claimed is:

1. A rubber composition for tire comprising:
   70 to 200 parts by mass of a filler and
   60 to 250 parts by mass of a softener compounding 15 to 60 parts by mass of a tackifying resin with a softening point of not less than 110° C.
   based on 100 parts by mass of a diene rubber component comprising not less than 20% by mass of a styrene-butadiene copolymer rubber a (SBRa) having a glass transition temperature of −35 to 15° C., a styrene content of 35 to 48% by mass and a vinyl unit quantity in the butadiene component of 35 to 55%,
   wherein the diene rubber component is a diene rubber component consisting of an SBRa and a styrene-butadiene copolymer rubber b other than SBRa (SBRb) only,
   wherein the tackifying resin is a copolymer resin of 1-methyl-4-(1-methylethenyl)-cyclohexene and/or (1S, 5S)-2,6,6-trimethylbicyclo[3.1.1]-2-heptene and/or (1S,5S)-6,6-dimethyl-2-methylenebicyclo[3.1.1]heptane and aromatic vinyl, or a hydrogenated product thereof.

2. The rubber composition for tire of claim 1, wherein the aromatic vinyl of the tackifying resin is styrene.

3. The rubber composition for tire of claim 1, wherein the filler comprises not less than 70 parts by mass of carbon black having a nitrogen adsorption specific surface area of 100 to 300 $m^2/g$ and oil absorption number of 100 to 150 $cm^3/100$ g.

4. A pneumatic tire having a tread composed of the rubber composition for a tire of claim 1.

5. The rubber composition for tire of claim 1, wherein the content of the SBRb in the diene rubber component is 20 to 80% by mass.

6. A pneumatic tire having a tread composed of the rubber composition for a tire of claim 4, wherein the aromatic vinyl of the tackifying resin is styrene.

7. A pneumatic tire having a tread composed of the rubber composition for a tire of claim 6, wherein the content of the SBRb in the diene rubber component is 20 to 80% by mass.

8. A pneumatic tire having a tread composed of the rubber composition for a tire of claim 7, wherein the filler comprises not less than 70 parts by mass of carbon black having a nitrogen adsorption specific surface area of 100 to 300 $m^2/g$ and oil absorption number of 100 to 150 $cm^3/100$ g.

* * * * *